Jan. 6, 1931.    A. H. LEIPERT    1,787,539
CUSHION CONNECTION FOR VEHICLE CONSTRUCTION
Filed Feb. 16, 1926
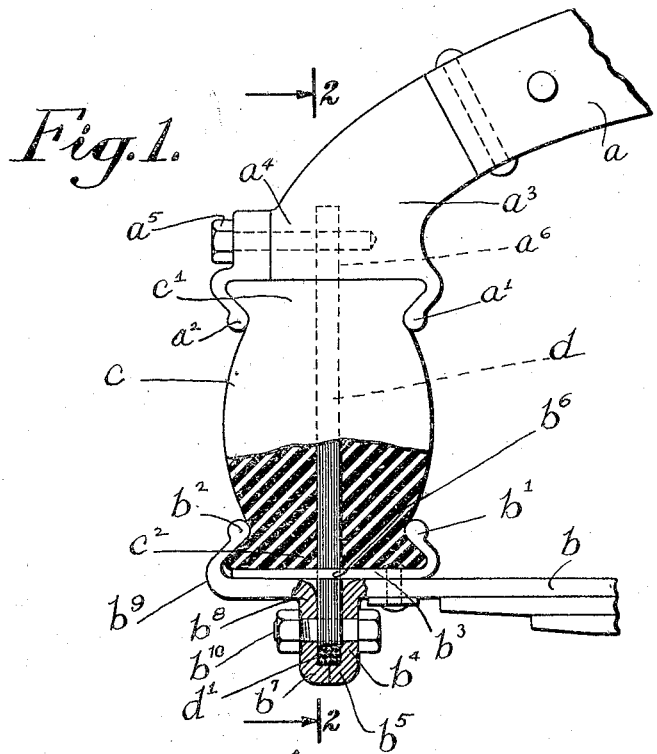
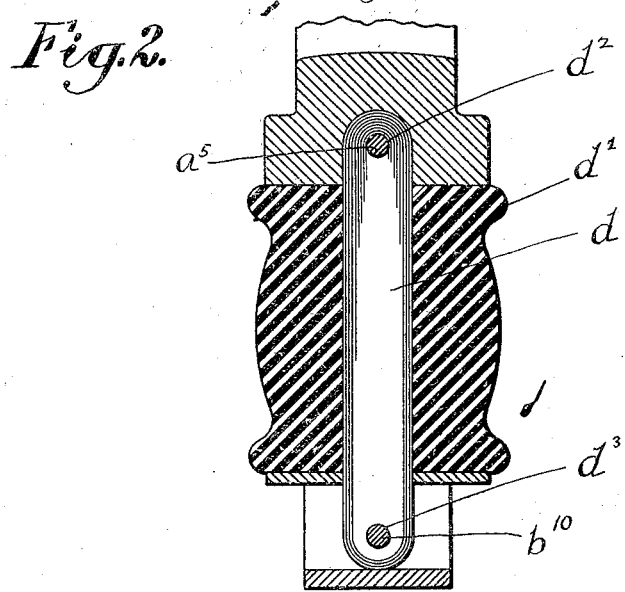
Inventor
AUGUST H. LEIPERT Patented Jan. 6, 1931

1,787,539

UNITED STATES PATENT OFFICE

AUGUST H. LEIPERT, OF NEW YORK, N. Y., ASSIGNOR TO INTERNATIONAL MOTOR COMPANY, OF NEW YORK, N. Y., A CORPORATION OF DELAWARE

CUSHION CONNECTION FOR VEHICLE CONSTRUCTION

Application filed February 16, 1926. Serial No. 88,561.

In a copending application of August H. Leipert filed February 16, 1926, Serial Number 88,562, there is disclosed a cushion connection between two parts, one of which parts is to be connected to and supported by the other part, involving yielding non-metallic material whereof spaced portions are retained under internal static pressure and are secured, respectively, to the two parts. The present invention has to do with a cushion connection of the general type of that forming the subject matter of the copending application but having the added characteristic of affording a snubbing action particularly applicable when the connection is interposed between a vehicle frame member and the spring suspension. This is accomplished by molding within the yielding nonmetallic material what may be termed a fabric link adapted to extend between and be connected to the respective connected parts to limit the degree of separation thereof under conditions of rebound and the like. There is also as an object, the particular structure of the fabric link embodied in the cushion connection according to the present concept which shall render it convenient and practical of manufacture and durable and effective in use. Accordingly the link is made of continuous spirally wound strands of fibrous material, preferably impregnated with a congelaceous material, such as rubber, to resist tensile stresses and having bolt holes formed therein, about which some or all of the strands are disposed, by which the link is connected to the spaced parts. The invention also seeks to provide a construction of co-operating parts which affords the desired results and at the same time conforms to standard automotive practice. These and other objects of the invention and the means for their attainment will be more apparent from the following detailed description of the accompanying drawings illustrating a preferred embodiment of the invention in which:

Figure 1 is a view in side elevation and partly in section showing the cushion connection according to the present invention and particularly the manner of securing the fabric link, which is molded within the block of yielding non-metallic material, to the frame member and spring, respectively.

Figure 2 is a view taken in the plane indicated by the line 2—2 in Figure 1 and looking in the direction of the arrows.

As in the embodiment illustrated in the copending application, the frame member $a$ is connected to and supported by the leaf spring $b$ through the instrumentality of a cushion connection indicated as a whole at $c$. This cushion connection is preferably a block of rubber having portions $c'$, $c^2$ at its ends defined by areas of reduced diameter which facilitate the securing of the block to the respective spaced vehicle parts and the retention of such portions under compression by seats on the vehicle parts. As in that embodiment spaced portions of the block, such as at $c'$, $c^2$ are secured to the respective parts $a$, $b$ and are retained under internal static pressure at those portions by inwardly directed seat walls $a'$, $a^2$ engaging the front and rear faces of the portion $c'$ and walls $b'$, $b^2$ engaging similar faces of the portion $c^2$. While the portions $c'$, $c^2$ of the block are substantially similar in form as the inclined co-operating walls $a'$, $a^2$ and $b'$, $b^2$ they are formed somewhat oversize in order that upon disposal within the seats they will be compressed thereby and thus be retained under internal static pressure. In the preferred embodiment the seat wall $a'$ is formed directly on an end member $a^3$ serving as the termination of the frame member $a$ and the wall $a^2$ is formed on a co-operating part $a^4$ secured to end member $a^3$ by a bolt $a^5$ adapted to draw the co-operating front and rear walls $a'$, $a^2$ together to exert the desired degree of compression upon the engaged portion $c'$ of the block.

The bolt $a^5$ also serves as securing means for the adjacent end of the fabric link $d$ constituting a snubbing element between the frame member and the spring to limit the degree of separation thereof under rebound etc. In the illustrated embodiment it is formed of continuous strands $d'$ of fabric or fibrous material wound spirally as shown about, in part at least, the bolt holes by which the link is secured to the respective connected parts to prevent fraying under tensile stresses and impregnated with a congelaceous substance, such as rubber, to form an integral link. It is embedded in the block of yielding non-metallic material and the upper end thereof is secured within the recess $a^6$ formed in the cooperating parts $a^3$, $a^4$ by the bolt $a^5$ passing through the hole $d^2$.

The other end of the link and the proximate end $c^2$ of the block are secured to the spring in the following manner: At the opposite end of block $c$ wall $b'$ is shown as formed upon a seat element $b^3$ having a passage $b^6$ for the link $d$, which seat element is secured to the end of the spring. The spring is bent downwardly as at $b^4$ and again horizontally as at $b^5$ to form one side and half the bottom of a recess for the reception of the end of the link and the other half of the bottom $b^7$ and the opposite side $b^8$ of the recess is formed by a clamping element $b^9$ upon which the inturned wall $b^2$ is formed to cooperate with the inclined wall $b'$, the desired degree of compression upon the block portion $c^2$ being effected by drawing the two walls $b^4$, $b^8$ together as with a bolt $b^{10}$. The bolt $b^{10}$ is also availed of to secure the end of the link $d$ in position by passing the same through an aperture $d^3$ formed therein.

When the block is assembled in weight supporting relation between the spring $b$ and frame member $a$, it will naturally be distorted as shown clearly in the drawings, that is, its height will be reduced and its thickness increased. The link, of course, will not compress to the same degree as the block and for this reason its length from center to center of the bolt holes is made somewhat shorter in proportion to the height of the block $c$ before distortion.

It will thus be seen that there has been provided a cushion connection and support between parts, one of which parts is to be connected to and supported by the other part of extremely simple character but great efficiency in certain situations. The invention is particularly applicable in a motor vehicle as a connection and support between the vehicle frame and a leaf spring. Yielding non-metallic material is availed of as a weight supporting instrumentality which is securely maintained in position with respect to the connected parts. Supplementing the action of the yielding non-metallic material and determining the separation of the respective parts there is provided a link of fabric material which in the preferred embodiment takes the form of continuous spirally wound strands impregnated with a congelaceous material and provided with bolt holes by which spaced portions of the link may be connected to the respective parts, the strands passing or being looped about both bolt holes in the interest of strength.

According to the broadest aspects of the invention various modifications may be made in form and composition of the co-operating parts and no limitation is intended by the foregoing description except as indicated in the accompanying claims.

What I claim is:

1. In a cushion connection of the character described, the combination with a vehicle frame and a leaf spring, of seats formed on the frame and spring end, respectively, a block of yielding non-metallic material interposed between the frame and spring whereof spaced portions are disposed within the seats, a fabric link molded within the non-metallic material, and means to removably secure the ends of the link to the frame and spring, respectively.

2. In a cushion connection of the character described, the combination with a vehicle frame member, a leaf spring, of a seat member formed with a seat portion and a downwardly and rearwardly directed wall, a supplemental seat member formed with a seat portion and a downwardly and forwardly directed wall, said seat members being recessed in their proximate faces, a bolt to secure said seat members together and passing through the recess formed in the seat members, a seat member formed with an upwardly and rearwardly directed wall, means to secure the last named seat member to the spring end, the spring end being bent downwardly and rearwardly and a supplemental end member bent downwardly and forwardly to cooperate with the end of the spring to form a recess and being formed with an upwardly and forwardly directed seat wall, a bolt to secure the supplemental end member to the spring end passing through the recess formed thereby, yielding non-metallic material disposed between the respective seats and a link associated with the non-metallic material and having its ends disposed within the recesses, respectively, and secured by the bolts.

3. In a cushion connection of the character described, the combination with two parts, one of which is to be connected to and supported by the other part, of means to limit the degree of separation of the parts comprising a link of spirally wound non-metallic strands embedded in congelaceous material.

4. In a cushion connection of the character described, the combination with two parts, one of which is to be connected to and supported by the other part, of means to limit the degree of separation of the parts comprising a link of spirally wound non-metallic strands embedded in congelaceous material and formed with bolt holes near the ends about which the strands extend.

This specification signed this 15th day of February, A. D. 1926.

AUGUST H. LEIPERT.